INVENTOR.
RICHARD V. WIBLE

United States Patent Office

3,430,013
Patented Feb. 25, 1969

3,430,013
RUDDER PEDAL SWITCH
Richard V. Wible, Dayton, Ohio, assignor to the United States of America as represented by the Secretary of the Air Force
Filed Nov. 15, 1967, Ser. No. 683,767
U.S. Cl. 200—86.5                                            6 Claims
Int. Cl. H01h 3/14

ABSTRACT OF THE DISCLOSURE

A foot operated switch incorporated in a yaw axis rudder pedal control member for a helicopter which is moved to a circuit closing position for a yaw axis automatic pilot by depression of the pilot's foot toward the pedal member and movable to its circuit opening position by lateral movement of the operator's foot along the pedal member toward the outer end thereof.

Background of the invention

Certain aircraft, such as helicopters, "VTOL" aircraft, or even some standard aircraft have automatic controls which prevent changes in orientation or "yaw" axis, nose wheel steering, and heading functions, with switch means for interrupting these automatic stabilizing or aircraft orientative functions so that the pilot or operator of the aircraft can manually "take over" these orientation controls. Previously these switch control devices were positioned for actuation by the aircraft pilots hands and often located where it interfered with the pilot's prompt attention to other necessary manual control functions, sometimes seriously distracting the pilot's attention from the proper quick consideration of the aircraft instruments and actuation of the aircraft flight control members and duties in order to quickly locate and actuate the switch means especially during "take off" and/or landing operations.

Summary of the invention

This invention solves the above noted problems, and has for an object the provision switch means for an automatic or "autopilot" control device for controlling "yaw" function, nose wheel steering and heading functions of an aircraft, comprising a switch under the immediate and convenient foot control of the pilot while his feet are on the manual foot control members, for instance the rudder or steering control members or pedals, thus leaving the pilot's hands and attention free for other operational and important duties, especially in connection with helicopters and "VTOL" aircraft, and more particularly, an object of the invention is the provision of a toggle lever operated switch of the solenoid holding type for energizing or deenergizing the yaw axis control "autopilot" device of the aircraft in which the switch is fixed on or in the end of one of the rudder or steering control members or pedals so that it can be actuated to either one of its circuit making or circuit breaking positions, for instance, by depression of the pilot's foot toward the rudder pedal to close the switch to energize the "yaw" control autopilot, or when the "yaw" control "autopilot" is energized the switch can be moved to its other position to deenergize the automatic "yaw" control device by lateral movement of the pilot's foot along the pedal, without removal of the foot from the pedal member.

A further object is the provision of a toggle lever actuated switch having an elongated casing with a solenoid therein for holding the switch closed by the circuit which is closed by the switch after it has been moved to closed position and spring means for moving the switch and toggle lever to "open" position when the circuit controlled by the switch is broken, including a toggle actuating lever pivotally carried by the casing which is connected by an actuating link to the toggle switch lever and formed with an angularly bent end portion extending above and over the end portion of the casing for depression thereof toward the casing to move the toggle lever and switch to one of its circuit controlling positions, and impingement on the outer end of the bent portion by movement of the foot at right angles to the aforesaid depression movement toward the outer end of the casing moves the toggle lever and switch to its other circuit controlling or interrupting position.

A further object is the provision of compression spring means between the actuating link member and the toggle actuating lever which is compressed by depression of the bent portion of the toggle actuation lever toward the casing disposed for raising the outer end of the bent portion to a predetermined elevated position above the casing so that when the toggle actuating lever is released following the depression thereof toward said casing the spring means will raise the outer end of the bent portion in position to be actuated by pressure applied to the outer end of the bent portion in a direction substantially parallel to the casing and toward the toggle lever end thereof to actuate the switch toggle lever to its other or circuit opening position.

Other objects and advantages of the invention will become apparent from the following description and accompanying drawings in which like reference characters refer to like parts in the several figures.

Description of the preferred embodiment

Figure 1:
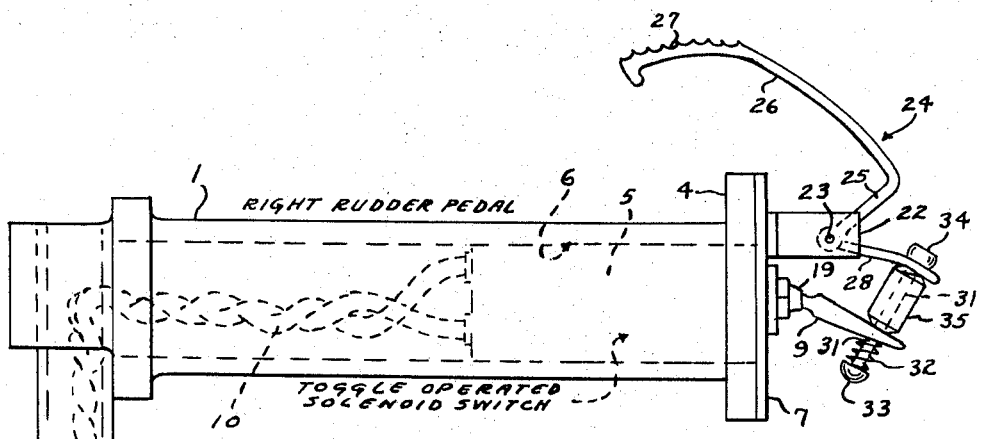
FIGURE 1 is a view in elevation of a helicopter rudder or steering control pedal with a foot actuated "yaw" axis autopilot solenoid control switch incorporated therein.

Referring to the drawings, and more particularly to FIGURE 1 the reference numeral 1 denotes a manual control member, for instance, a rudder control pedal of a helicopter or "VTOL" aircraft (not shown), and preferably the right hand rudder pedal which is carried by a lever arm 2 for operating the rudder control or actuating shaft 3. The pedal 1, lever 2, and shaft 3 are of substantially conventional construction and hollow. The pedal, as shown, is cylindrical having a flanged outer end 4 and, of course, is mounted in front of the pilot's seat (not shown) for convenient actuation by the pilot's right foot. There is, of course, a similar conventional "left" rudder pedal (not shown) for actuation by the other or left foot of the pilot of the aircraft. These pedals control the steering direction or "yaw" axis of the aircraft in the usual manner.

Certain aircraft such as some helicopters and "VTOL" (vertical take off and landing) aircraft are provided with automatic "yaw" axis control devices (not shown) which, when in operation, maintain the longitudinal axis of the aircraft fixed or stabilized. Switch means are also conventionally provided for selectively energizing, or deenergizing this "yaw" axis control device, often referred to as the "yaw" axis autopilot.

The improved solenoid toggle switch of this invention comprises a cylindrical casing 5 which is fixed in the cylindrical bore 6 of the pedal member 1 and provided with an annular end closure flange 7 for securing the switch in place against the outer end flange 4 of the pedal member by suitable fasteners, indicated at 8.

Figure 2:
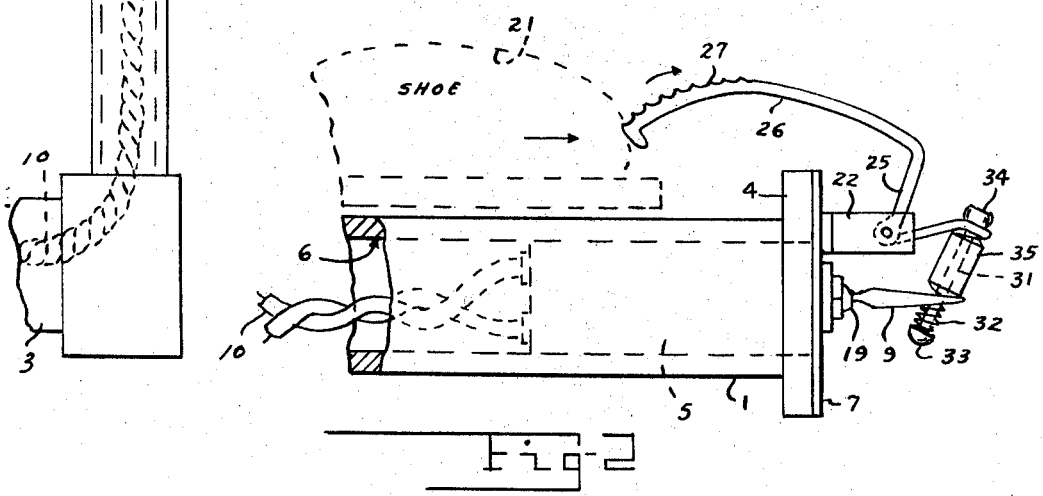
FIGURE 2 is a fragmentary view in elevation of the outer portion of the steering control pedal member shown in FIGURE 1, with a pilot or operator's foot, or shoe, shown therein, in dotted lines.

The switch is operated by a toggle lever 9 which extends outwardly from the outer end of the steering control pedal as shown and is movable in the end plate 7 between the two circuit closing and opening positions as shown respectively in FIGURES 1 and 2, for opening and closing controlling circuit comprising conductors indicated at 10, for instance, for opening or closing a control circuit to the aforementioned "yaw" control "autopilot" (not shown) of an aircraft, such as a helicopter or "VTOL" aircraft.

The switch is preferably of the solenoid "holding" type which comprises a fixed contact terminal 11 and a solenoid coil 12 adapted to be connected in circuit with one side of the energizing circuit conductors 10. The other one of the two circuit conductors 10 is connected to a movable switch contact blade 13 which is yieldably stressed toward its open position, as seen in full lines in FIGURE 3, by a spring 14, the blade 13 being pivoted to the casing, for instance at 15. A "solenoid" armature or core 16 is connected to the blade 13 at 17. The toggle lever 9, as shown, carries an arm extension 18 projecting beyond its pivot point 19 which is connected by a link 20 which is connected to the switch contact blade 13.

Figure 3:
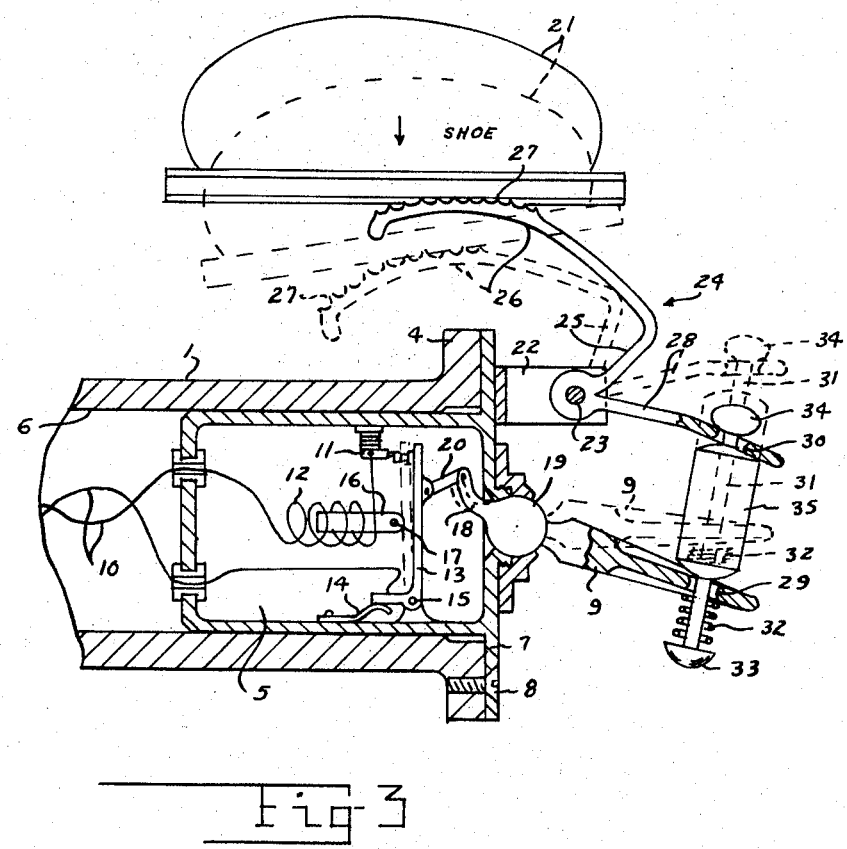
FIGURE 3 is an enlarged fragmentary substantially vertical sectional view through the outer end portion of the helicopter steering control pedal, showing the incorporated foot actuated control switch and closed circuit holding solenoid in circuit "breaking" position in full lines, and in circuit closing position in dotted lines.

Any other suitable or conventional solenoid toggle switch may be employed since the invention is not particularly in the specific toggle switch, but in the association and arrangement of the toggle switch on the manual control member 1 so that it can be operated by the foot in conjunction with manual or foot control and actuation of the control member 1, for instance to one of its positions by depression of the foot indicated at 21, toward the control member 1 as seen in FIGURE 3, and to its other position by movement of the foot 21 along the rudder or other control member 1 toward the outer end thereof, as seen in FIGURE 2.

The end closure plate or flange 7 of the solenoid casing 5 is formed with a bracket 22 located above the toggle lever pivot or socket 19 on which is pivoted at 23 the foot operable toggle actuating lever indicated generally at 24. The actuating lever 24 is formed with an upwardly extending arm portion 25 which terminates in a laterally extending bent or curved portion 26 which extends over the upper portion of the flanges 4 and 7 and inwardly over the cylindrical casing 5 and the cylindrical rudder control pedal member 1, in position to be depressed toward the surface of the pedal member 1, by the pilot upon movement of his foot or shoe 21 downwardly toward the outer portion of the pedal 1. Space is provided between the inner or free end of the bent portion 26 and the inner end of the pedal for the foot 21 to rest on and engage the pedal member 1 "inside" of the lever 24 or to the "left" of it as seen in the drawings, particularly FIGURE 2. The "upper" surface of the bent portion 26 of the lever may be corrugated as at 27 to be engaged by the sole of the pilot's shoe 21 in depressing the actuating lever portion 26 from its normal circuit control position shown in FIGURE 1 to its actuated or second position shown in dotted lines in FIGURE 3.

The toggle actuating lever 24 is formed with an outwardly extending toggle actuating arm member 28 which is shifted upwardly by depression of the lever portion 26 and downwardly by upward or "clockwise" movement of the actuating lever 24 around the pivot 23 (from position shown in FIGURE 2 to that shown in FIGURE 1).

The switch toggle lever 9 extends outwardly from the plate 7 below the toggle actuating portion 28 of the lever 24 with its outer end apertured at 29 while the outer end portion of the arm 28 is similarly apertured at 30 and a "link" rod 31 extends through both of the apertures 30 and 29 and beyond or below the lower or toggle lever aperture 29 and a compression coil "return" spring 32 is disposed on the rod or link 31 with one end thereof bearing against the lower surface of the toggle lever 9.

Enlarged heads or ball shape abutment members 33 and 34 are disposed on the lower and upper ends of the link rod 31.

An enlarged cylindrical sleeve-like actuating separator 35 is disposed on the link rod 31 with its opposite ends disposed to engage and impinge the adjacent or facing lower and upper surfaces respectively of the actuating lever portion 28 and the toggle lever 9. The separator 35 may be made if desired of resilient or rubber-like material with its opposite engaging or impinging ends rounded for better engagement with the toggle and toggle actuating levers 9 and 28.

The operation of the invention should be self evident. Where used with a helicopter or similar aircraft having a "yaw" control autopilot and the usual right and left manual foot control rudder pedals the switch is mounted in the right rudder pedal with the switch toggle lever projecting outwardly for up and down movement. The foot actuated lever 24 curves back over the outer end of the pedal with its free end in predetermined spaced relation to the upper surface of rudder pedal. The operator or pilot may place his feet on the rudder pedals in the usual manner, beside the end of the curved lever 24. When it is necessary to close the switch, the right foot can be quickly raised, swung over and depressed on the lever portion 27 to close the switch and circuit 10. When the foot is moved to the left off the lever 27 and onto the rudder pedal, the coil spring 32 previously compressed by depression of the lever and link rod 31 is free to expand and raise the free end of the lever 26 to the position above the plane of the lever pivot 23 and surface of the pedal 1 as seen in FIGURE 2. The switch is "opened," for instance, to break the circuit to the "yaw" control autopilot by the operator or pilot sliding his foot on the rudder pedal toward the outer end of the pedal. The foot impinges and rocks the lever upwardly. The arm 28, through the abutment sleeve member 31 impinges and moves the toggle lever 9 downwardly. As soon as the circuit in the conductors 10 is broken the spring means in the switch, such as the spring 14 separates the switch contacts and holds the toggle lever, and through the coil spring 32 and link rod 31, holds the foot depression lever 26 raised as seen in FIGURE 1 and ready for depression by the pilot's foot when it is again desired to close the circuit 10. This arrangement leaves the pilot's hands and other facilities free which is sometimes very important during takeoff and landing of helicopters and other "VTOL" aircraft, as well as other types of vehicles.

For purposes of exemplification, a particular embodiment of the invention has been shown and described to the best understanding thereof. However, it will be apparent that changes and modifications in the arrangement and construction of the parts thereof may be resorted to without departing from the true spirit and scope of the invention as defined in the following claims.

I claim:
1. A foot actuated rudder control member (1) having an outer end portion (4), circuit controlling switch means (5–9) carried by said foot actuated rudder control member (1), having first and second circuit controlling positions, foot operated switch actuating means (24) carried by said foot actuated rudder control member (1) having a foot engaging extension (26) having an initial predetermined position located above the outer end portion (4) of said foot actuated rudder control member (1), and movable upwardly away from, and depressible downwardly toward said foot actuated rudder control member (1) from said initial position to corresponding second and first circuit controlling positions, respectively, actuating means (31) connected between said circuit controlling switch means (5–9) and said foot operated switch actuating means (24) for moving said circuit controlling switch means to said first circuit controlling position by depression of said foot actuated extension (26) toward said foot actuated rudder control member (1), and movable to said second circuit controlling position by upward movement of said foot actuated extension (26) away from said foot actuated rudder control member (1) from said initial position thereof, and spring means (32) in said actuating means (31) between said circuit controlling switch means (5–9) and said foot operated switch actuating means (24–26) expansible for moving said foot actuated extension (26) upwardly to said initial position following depression of said foot actuated extension by an operator's foot toward said foot actuated rudder control member (1) and removal of the foot from said foot actuated extension (26).

2. A foot actuated rudder control member and circuit controlling switch means as claimed in claim 1, in which said foot actuated rudder control member comprises a rudder steering pedal member (1) for directional steering control of a vehicle by the foot of an operator, said pedal member having an outer end (4), and said circuit controlling switch means (5–9) comprises a casing (5) fixed in the outer end of the pedal member (1), a bracket (22) fixed to the upper portion of the outer end (4) of said pedal member (1), said foot operated switch actuating means (24–9) pivoted on said bracket (22) and comprising a toggle switch actuating lever arm (28) projecting outwardly away from said outer end (4) of said pedal member (1) with an upwardly extending foot actuated extension (25–26) curving inwardly above and over said outer end (4) of said pedal member, in spaced relation above the pedal member for depression thereof from the initial predetermined position above said pedal member toward said pedal member, and said circuit controlling switch means (5–9) comprises a solenoid circuit holding toggle switch in said casing (5) fixed in the outer end of said pedal member, having a toggle switch lever (9) projecting outwardly away from the outer end (4) of said pedal member (1), below a horizontal plane through the aforesaid pivot for the foot operated toggle switch actuating lever arm (24) with said toggle switch actuating lever arm (28) disposed in substantially parallel relation to said toggle switch lever (9), and the actuating means (31) therebetween comprises a yieldable link member (31–35) connected between the outer end portions of said toggle switch lever (9) and said toggle switch actuating arm (28) for limited relative movement therebetween, for moving the toggle switch lever (9) upwardly to said first circuit controlling position by depression of the foot actuated extension (26) toward the pedal member (1) and movable downwardly to its second circuit controlling position by said yieldable link member by sliding movement of an operator's foot along said pedal member (1) toward the outer end of the pedal member, into lifting impingement against and under the outer end of the foot actuated extension (26) of said foot operated toggle switch actuating lever (24).

3. A combined foot actuated rudder control member and steering control pedal member (1) and toggle switch actuating lever arm (28) as set forth in claim 2, which includes compressible coil spring means (32) in said yieldable actuating connection (31), compressible by depression of the foot actuated extension (26) toward said pedal member (1) for subsequent expansion of said spring means 32 to swing said toggle switch actuating lever arm (28) downwardly around its pivot (23) to move the foot actuated extension (26) thereof upwardly away from said pedal member (1) to move the outer end thereof into predetermined spaced position above the surface of said pedal member (1) for impinging foot actuation against and under the outer end of said extension (26) by sliding movement of an operator's foot (21) along the pedal member (1) toward the outer end (4) thereof to contact and move said toggle switch actuating lever arm (28) to its first circuit controlling position, and removal of the foot from said foot actuated extension (26) permits said spring means (32) to return said foot actuated extension (26) to its initial position above the pedal member (1).

4. A vehicle steering control pedal member (1) having an outer end (4), a circuit controlling solenoid toggle switch (5) fixed in said outer end (4) having a toggle switch lever (9) projecting outwardly therefrom and movable upwardly and downwardly for actuating the toggle switch to first and second circuit controlling positions, a foot operated toggle switch actuating arm means (24–28) pivoted to the outer end (4) of the pedal member (1) for up and down movements to and from an initial position, an actuating link connection (31) between the foot operated toggle switch actuating arm means (24) and the toggle switch lever (9) for actuating the toggle switch lever (9) by the foot operated toggle switch actuating arm means (24), said foot operated toggle switch actuating arm means (24) having a foot engaging extension (25–26) projecting upwardly and then curving inwardly over the outer end portion (4) of the pedal member (1) for downward depression from a predetermined initial position toward the pedal member (1) by downward movement of an operator's foot (21) on said extension (26), for moving the toggle switch lever (9) upwardly to actuate the toggle switch to the first circuit controlling position, spring means in said actuating link connection (31) between the toggle switch lever 9 and the lower end of the link connection (31), compressible by downward movement of an operator's foot (21) on the extension (26) toward the pedal member (1), to return the foot engaging extension (26) upwardly to its initial position, following removal of the operator's foot (21) from the foot engaging extension (26), abutment spacer means (35) on the actuating link connection (31) between the toggle switch lever (9) and the toggle switch actuating arm means (28) for positively moving said toggle switch lever (9) downwardly to its second circuit controlling position by said foot operated switch actuating extension (26) from the initial position thereof, by outward movement of an operator's foot (21) along said pedal member (1) toward the outer end thereof into lifting impingement against the outer end of the foot engaging extension extension (26), while the operator's foot (21) is in steering control relation on the pedal member (1).

5. A vehicle steering control pedal member as set forth in claim 4, in which the outer end portions of the foot operated toggle switch actuating arm means (24–28) and the toggle switch lever (9) are apertured, and said actuating link connection comprises a rod (31) extending through the apertures with the compression coil spring (32) thereon located between the toggle switch lever (9) and the lower end of the rod, said rod having an abutment head at its upper end in engagement with the upper surface of the toggle switch actuating arm means (28) and a second enlargement head (33) at its lower end engaging the compression coil spring (32), with the abutment spacer means (35) on said rod (31) with its opposite ends in contacting engagement with said toggle switch lever (9) and said toggle switch actuating arm means (28), said toggle switch actuating arm means comprising a foot actuated extension projecting over the foot pedal member (1) with an outer extremity disposed in spaced relation above the pedal member (1) for upward camming impingement by outward movement of an operator's foot (21) along the pedal member (1) toward the outer end thereof to move the toggle switch lever (9) to circuit breaking position and depressible by downward movement of the operator's foot on said foot actuated extension toward the pedal member (1), to compress the coil spring (32) and move the toggle switch lever (9) to circuit closing position.

6. A combined foot actuated steering control pedal member and solenoid toggle switch for helicopter autopilot comprising, an elongated steering pedal, a solenoid toggle switch fixed in the other end of said elongated steering pedal, a toggle switch actuating lever pivoted at the outer end of said elongated steering pedal having an initial position and having a foot actuated extension in a plane through the elongated steering pedal, parallel to the longitudinal axis thereof, said extension curving upwardly and inwardly over the outer end of said elongated steering pedal, having a predetermined initial raised position in said plane, above said elongated steering pedal, and movable downwardly toward, and upwardly from said initial raised position and said steering control pedal, a yieldably operating connection between said toggle switch actuating lever and said solenoid toggle switch for moving said solenoid toggle switch to circuit closing and holding position when said foot actuating extension is depressed from the initial position toward said steering pedal, said foot actuating extension having a foot caming extremity in said plane in predetermined spaced relation above said elongated steering pedal, intermediate the opposite ends thereof when the toggle switch actuating lever is in said initial position to dispose said extremity in the path of an operator's foot along said elongated steering pedal toward the outer end thereof, for camming and raising said extremity upward from its initial position, to move said solenoid toggle switch to circuit breaking position.

References Cited

UNITED STATES PATENTS

| | | | |
|---|---|---|---|
| 1,683,280 | 9/1928 | Arthur | 200—86.5 |
| 1,872,618 | 8/1932 | Butte | 200—86.5 |
| 3,287,520 | 11/1966 | Stevens et al. | 200—86.5 |
| 3,353,424 | 11/1967 | Peterson et al. | 200—86.5 |

ROBERT K. SCHAEFER, *Primary Examiner.*

H. O. JONES, *Assistant Examiner.*